United States Patent
Spiess et al.

[15] 3,688,636
[45] Sept. 5, 1972

[54] ROCKET & LAUNCHER ASSEMBLY WITH THRUST ADJUSTMENT

[72] Inventors: Irwin Spiess, Pequannock; Gabriel G. Gratkowski, Dover, both of N.J.

[73] Assignee: The United States of America as represented by the Secretary of the Army

[22] Filed: Oct. 23, 1970

[21] Appl. No.: 83,580

[52] U.S. Cl. ............... 89/1.8, 60/254, 60/271, 89/1.816, 102/49.7, 102/49.8
[51] Int. Cl. ............... F41f 3/04, F42b 15/18
[58] Field of Search ... 239/265.19; 60/242, 271, 254; 244/3.72; 89/1.816, 1.818; 102/49.7, 49.8, 49.3

[56] References Cited

UNITED STATES PATENTS

| | | |
|---|---|---|
| 2,612,747 | 10/1952 | Skinner.................60/242 X |
| 2,644,364 | 7/1953 | Nass......................89/1.818 |
| 2,383,053 | 8/1945 | Fanger et al..............102/49.1 |
| 2,489,953 | 11/1949 | Burney....................89/1.818 |
| 2,981,061 | 4/1961 | Lillgren................244/3.22 X |
| 2,933,889 | 4/1960 | Tolkmitt..............102/49.3 X |
| 3,307,451 | 3/1967 | Bucklisch et al. ........89/1.703 |

*Primary Examiner*—Samuel W. Engle
*Attorney*—Harry M. Saragovitz, Edward J. Kelly and Herbert Berl

[57] ABSTRACT

A rocket and launcher assembly is disclosed, presettable to provide in the rocket discharged therefrom a thrust level in accordance with the height or range desired to be attained by said rocket. A rotatable sealing plate in the rocket may be manually adjusted prior to propellant ignition to direct propellant gases through one or another of several nozzle groups in a nozzle plate separated from the propellant by the sealing plate. The various nozzle groups are canted or otherwise configured to provide the varying thrust from group to group.

7 Claims, 8 Drawing Figures

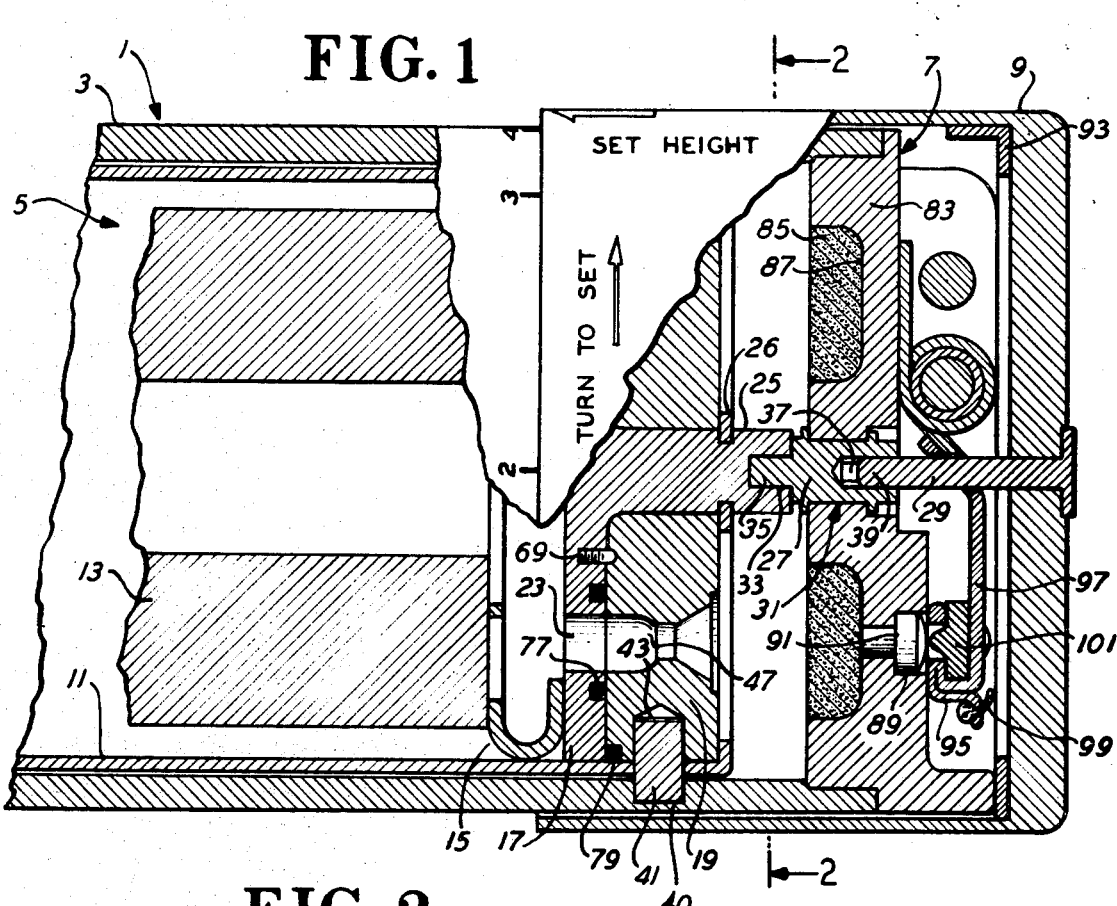
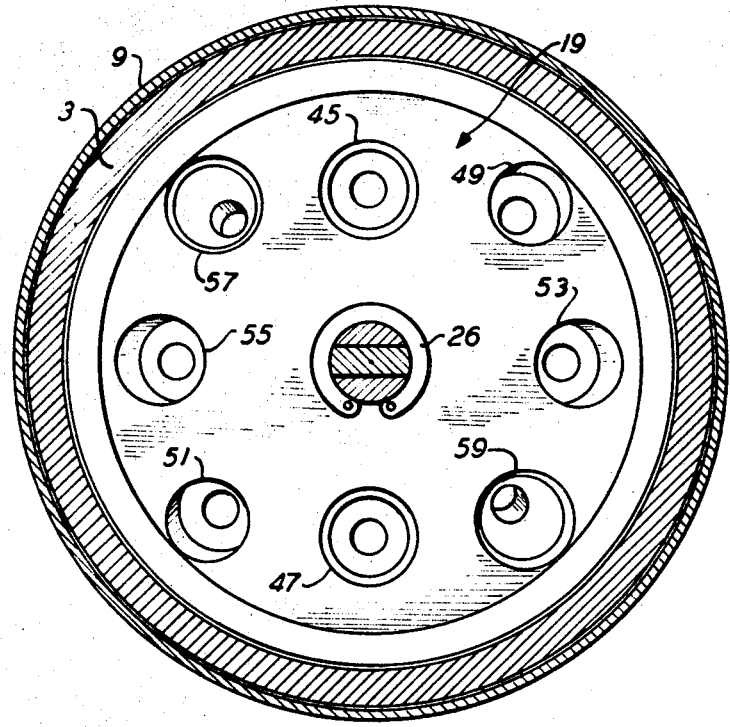
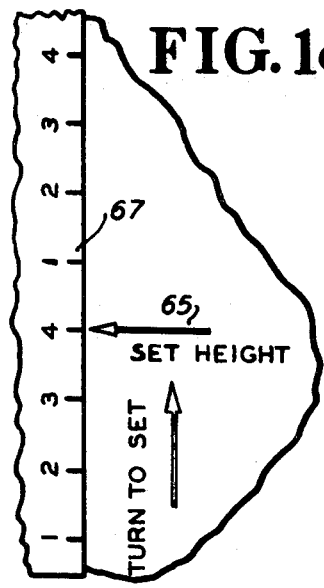

INVENTORS,
IRWIN SPIESS
GABRIEL C. GRATKOWSK

BY: Harry M. Saragovitz,
Edward J. Kelly &
Herbert Berl /ATTORNEYS

ROCKET & LAUNCHER ASSEMBLY WITH THRUST ADJUSTMENT

The invention described herein may be manufactured, used and licensed by or for the government for government purposes without the payment to us of any royalties thereon.

BACKGROUND OF THE INVENTION

This invention relates generally to solid propellant rockets, and more specifically relates to portable hand-fired rockets capable of performing a variety of missions requiring different thrust levels.

In numerous and varied civilian and military applications use is made of small, hand carryable rocket assemblies, capable upon manual activation of projecting a rocket-propelled payload. An example of such a device is a simple hand held rocket-propelled pyrotechnic device of the type comprising a small, capped launcher tube having a solid propellant rocket and a pyrotechnic payload —such as a flare or the like— nested therein. The user thereof has only to remove the caps from the launcher tube, hold the tube at arm's length —pointing in an upward direction— and pull a lanyard secured to the motor portion of the rocket. A small primer charge is thereby ignited which expels the rocket from the launcher tube and ignites the main body of solid propellant to carry the payload to some height or range where its effects will be useful.

Although commonly a user of such assemblies as are described above, would prefer to specify the particular height or range to be attained by the rocket payload — in accordance with terrain requirements, mission function or so forth— this has not in the past been deemed practicable. In general, on the contrary, solid propellant rockets, such as are utilized in assemblies of the type discussed are usually capable of performing only a fixed mission which is a function of their design. In particular, thrust and duration of operation are established by the design of nozzle and propellant charge and cannot be varied without varying one or both of these design elements. Thus, where it is desired to perform a variety of missions with a single design of rocket, some element other than the rocket motor is usually selected to be variable. In units which are launched by an auxiliary method, such as artillery rockets fired from guns, the gun charge and/or gun tube elevation may be changed to vary the range of the projectile while the rocket thrust and duration remain constant. In other types of units, the aerodynamic drag may be varied by making available alternate designs of ogive or fins, thus varying the range of the unit. Still another technique involves use of thrust spoilers, or thrust deflectors, attached to the unit behind the nozzle to reduce the effective thrust. None of these cited methods, however, are deemed applicable to small, prepackaged, inexpensive units which must be available for immediate use without alteration. In the case, for example, of a pyrotechnic rocket launched from the hand of a user, it would hardly be desirable for the user to disassemble the unit to alter any of its design features, nor would it be practical to incorporate alternate parts in the package or expect the user to accomplish a modification in the field.

In accordance with the foregoing, it may be regarded as an object of the present invention, to provide a portable rocket and launcher assembly which may be readily preset by the user in the field so as to enable the rocket discharged therefrom to attain selected height levels.

It is another object of the invention, to provide a portable prepackaged rocket and launcher assembly for firing rocket-borne pyrotechnic payloads or the like, having inexpensive, dependable, completely self-contained, and virtually foolproof means for presetting the thrust level of the rocket, whereby to control the height to which said payload is projected.

It is a further object of the invention, to provide a solid propellant rocket for use in small, low-cost, prepackaged units such as signaling or illuminating flare assemblies, wherein rocket thrust may be simply and dependably set to selected levels without the use of auxiliary thrust deflectors or spoilers and without the use of aerodynamic drag elements.

SUMMARY OF THE INVENTION

Now in accordance with the present invention, the foregoing objects, and others as will become apparent in the course of the ensuing specification, are achieved through use of a solid propellant rocket having a nozzle plate provided with a plurality of nozzle groups, each said group being adapted to provide a discrete thrust level when propellant gases exit therethrough. The nozzle groups typically comprise paired units symmetrically positioned with respect to the rocket axis, the outward cant of the units varying from pair to pair to thereby vary the forward component of the thrust vector. The said nozzle plate is positioned at the end of the rocket motor tube and separated from the propellant by a manually rotatable seal plate. The seal plate is provided with apertures alignable with a nozzle group, and in accordance with the set rotational position of the seal plate propellant gases flow through said apertures and into one or another of said nozzle groups. In a preferred embodiment of the invention the said solid propellant rocket is nested in a launcher tube which is capped at both ends to provide a portable assembly. The cap at the motor end of the assembly is mechanically linked to the seal plate so that a field user of the assembly may adjust the rotational position of the seal plate by rotating the said cap prior to removal thereof and aligning an indicator on the cap with height indicia on the adjacent portion of the launcher tube.

BRIEF DESCRIPTION OF DRAWINGS

The invention is diagrammatically illustrated, by way of examples, in the drawings appended hereto, in which:

FIG. 1 is principally a longitudinal cross-sectional view through the motor end of an assembly in accordance with the invention, but includes a partial view of the assembly exterior;

FIG. 1A is a plan view of the exterior portion shown in FIG. 1, and illustrates the manner in which indicies on the assembly are preset by the user thereof;

FIG. 2 is a transverse sectional view of the assembly, taken along the line 2—2 of FIG. 1;

DESCRIPTION OF PREFERRED EMBODIMENT

Figure 3:
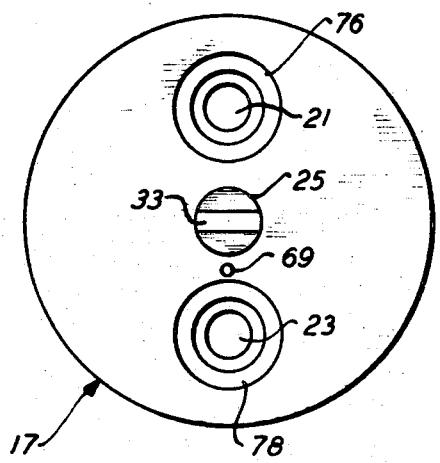
FIG. 3 is a reduced scale plan view of the seal plate portion of the assembly.

In FIG. 1 the motor end of a rocket assembly generally in accordance with the invention is depicted. The showing of the Figure is principally by way of longitudinal cross section, but a small portion of the assembly exterior also appears. The assembly, generally designated at 1, includes a launcher tube 3, a rocket 5 nested therein, an igniter assembly 7, and a frictionally held end cap 9. This combination of elements —to the extent they have been thus far described— is well-known and conventional in the art. Although not explicitely shown, the rocket 5 and launcher tube 3, in accordance with such known conventional construction, extend (in the sense of the Figure) to the left, the rocket there adjoining a payload intended to be borne aloft thereby —such as e.g. an incendiary flare. Also not shown but conventional is a second frictionally held end cap which encloses the undepicted end of the launcher tube.

Rocket 5 is defined at the perimeter thereof by a motor tube 11, and includes a charge of solid propellant 13 positioned and supported within tube 11 by a support member 15 —typically a spider-shaped member. In accordance with the present invention, support member 15 adjoins a seal plate 17, which in turn is in face-to-face contact with a nozzle plate 19.

Seal plate 17, as is seen in FIG. 1 and the plan view of FIG. 3 (the latter is on a reduced scale) is a generally disc-like member rotatable within motor tube 11 and including a pair of circular apertures 21, 23 symmetrically positioned with respect to the disc axis, and an extended neck portion 25. Neck portion 25 extends through the nozzle plate 19 adjoining seal plate 17 and thence connects to link 27, which link in conjunction with link 29 comprises the height adjustment linkage generally designated at 31. A retaining washer 26 seated about neck 25 holds plates 17 and 19 in face-to-face contact. As is seen in FIGS. 1 and 3 the connection between link 27 and plate 17 is via the keyed slot 33 in neck portion 25, which portion is adapted to frictionally engage a tongue 35 on link 27. A keyed frictional fit is also provided between links 27 and 29 via e.g. a hexagonal or similarly shaped hole 37 in link 27 and a similarly contoured head 39 at link 29. The nature of the connections between plate 17 and link 27, and between links 27 and 29 is thus seen to be such that the three cited elements may rotate rigidly as a unit when connected, and yet may be readily disengaged from one another by displacements in an axial direction.

Nozzle plate 19 as seen in FIGS. 1 and 2 is another disc-like member positioned at the terminus of motor tube 11. Unlike seal plate 17, however, plate 19 is not rotatable with respect to motor tube 11; on the contrary plate 19 is locked with respect to motor tube 11 by a pair of spin pins. Only one of the said pair is visible in the drawing, viz. pin 41. The latter is thus seen to project from hole 43 through the motor tube 11 and to the launcher tube wall. Like its unshown counterpart, pin 41 there engages a helical track 40 on the inside wall of tube 3. During the launching operation the spin pins are guided by such helical track to thereby impart stabilizing rotational motion to rocket 5.

Figure 4:
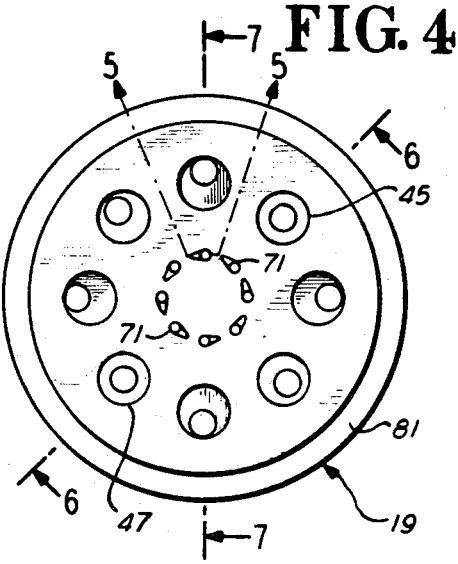
FIG. 4 is a reduced scale plan view of the nozzle plate portion of the assembly, taken from the side thereof positioned adjacent the seal plate.
Figure 7:
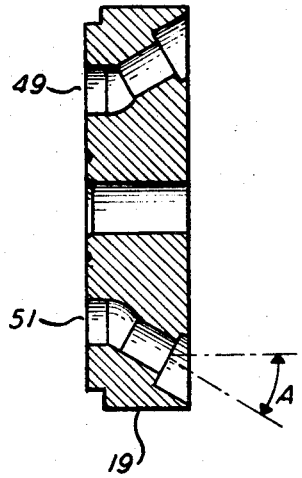
FIG. 7 is a cross-sectional view of the nozzle plate, taken along the line 7—7 of FIG. 4, and depicts the nozzle configuration utilized to yield minimum thrust.
Figure 6:
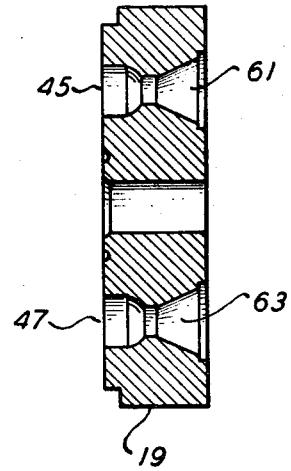
FIG. 6 is a cross-sectional view of the nozzle plate, taken along the line 6—6 of FIG. 4, and depicts the nozzle configuration utilized to yield maximum thrust.

Plate 19 includes a plurality of nozzle groups, shown in FIGS. 2 and 4 as the four distinct pairs, viz. pairs 45, 47; 49, 51; 53, 55; and 57, 59. In accordance with the invention the differing nozzle groups are so configured that discrete and differing levels of thrust are produceable in the rocket depending upon which of the nozzle groups propellant gases exit through. Specifically in FIG. 2 the nozzle pairs are all seen to be symmetrically arranged with respect to the axis of plate 19; however the outward cant of the nozzle pairs and/or the contours of the component nozzles varies from pair to pair to thereby provide differing thrust levels. This is best seen in the cross sectional views of FIGS. 6 and 7 depicting respectively the nozzle pairs 45, 47 and 49, 51. The pair 45, 47 of FIG. 6 is adapted to provide maximum thrust for a given flow therethrough in that all reactive thrust resulting from such flow will be axially directed, whereas the nozzle pair 49, 51 of FIG. 7 is canted with respect to the rocket axis at a substantial angle A, whereby the axial thrust produced by a similar flow will be reduced by at least the factor $(1-\cos A)$. Actually the thrust levels may be made to differ by more than this factor by varying the nozzle contour in addition to the cant. Thus the nozzles 45, 47 are seen to be provided with expansion zones 61, 63 which act to increase the energy extracted from expelled gases, while no such comparable zones are present in the nozzle pair 49, 51. In accordance with the invention nozzle pair 49, 51 will be utilized where minimum thrust is desired in the rocket fired from assembly 1 and nozzle pair 45, 47 will be utilized where maximum thrust is desired. The remaining nozzle groups —viz. nozzle pairs 57, 59 and 53, 55 have cant and/or expansion zone characteristics such as to provide discrete thrust levels intermediate the pairs illustrated in FIGS. 6 and 7.

Figure 5:
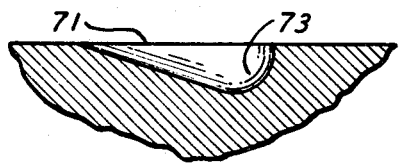
FIG. 5 is a partial, sectional view of the nozzle plate, taken along the line 5—5 of FIG. 4, and depicts the contour of the pin grooves in such plate.

With the aid of the foregoing the overall operation of the assembly 1 may now be understood. In particular it is seen that by rotating end cap 9 prior to removal thereof, the link 29 affixed to the end cap effects rotation of link 27 and thus of seal plate 17. The user during this operation observes indicator 65 on the cap periphery (seen in FIGS. 1 and 1A) and specifically rotates cap 9 until indicator 65 aligns with desired indicia 67 on the launcher tube exterior. The indicia 67 is actually calibrated in height figures (e.g. in 100's of feet) corresponding to the discrete thrust levels achieved at a given setting. Rotation of seal plate 17 acts to align the aperture pair 21, 23 therein with one or another of the nozzle pairs of plate 19 in accordance with the selected indicia setting. In order to assure accuracy of such alignment, a spring-biased position set pin 69 is provided at the face of seal plate 17 adjacent nozzle plate 19. Pin 69 engages one or another of the pin grooves 71 —best seen in FIG. 4— in accordance with the position of seal plate 17. It is further seen in FIG. 5 —a cross section along the line 5—5 of FIG. 4— that the contour of grooves 71 is such that the pin 69 will tend to seat at the well bottom 73 of groove 71 and thereby require a positive effort on the part of the user should he wish to advance the plate 17 to the next position. It will also be clear from the contour of grooves 71 that the plate 17 can only be rotated in one direction. This acts to prevent displacement of plate 17 by the angular acceleration forces present during launch. It also serves as an additional safeguard against error committed by the user.

Once the field user has rotated cap 9 and linked plate 17 to the desired position, he removes cap 9. Upon doing so link 29 disengages from link 27 and in important consequence it is no longer possible to rotate seal plate 17, unless the cap 9 is replaced —and in its precise keyed position. This acts as a further safeguard preventing accidental changing of the thrust setting.

With cap 9 removed we see that the rocket 5 is ready for firing. We note in this connection that the gas flow path which will now be provided between propellant body 13 and atmosphere is fully sealed enroute. In particular it is seen that the apertures 21, 23 of seal plate 17 are surrounded by gasket rings one of which is shown at 77, of teflon, neoprene rubber or the like positioned in channels 76 and 78 (FIG. 3) whereby propellant gases may not seep laterally at the interface of seal plate 17 and nozzle plate 19. Furthermore, we note in FIGS. 1 and 4 that gas seepage about the periphery of seal plate 17 is barred by a gasket ring 79 seated in a recess 81 at the face of nozzle plate 19.

Ignition and firing of the rocket is now carried out through activation of igniter assembly 7. The assembly 7, both in structure and mode of operation, is of conventional design —except to the extent its configuration is modified to permit passage of height adjustment linkage 31. It includes a plate member 83 joined to and closing launcher tube 3, the plate being provided with an expulsion charge 85 contained in an annular channel 87. A small explosive primer 89 is seated in a channel 91 communicating with the expulsion charge. The operator of assembly 1 fires primer 89 by pulling the lanyard ring 93 which is attached to the retaining clip 95 of spring arm 97 by a cord a portion of which is seen at 99. Arm 97 and clip 95 move back from the primer whereupon the clip 95 snaps free allowing arm 97 to spring toward the primer. A striker 101 on the arm 97 then impacts primer 89 to effect ignition thereof, and in turn ignition of expulsion charge 85. The hot gases from the latter act against the adjacent surface of nozzle plate 19 to expel rocket 5 from launcher tube 3, and simultaneously ignite solid propellant 13 by entering rocket 5 through nozzles 45, 47 and aligned apertures 21, 23 and impinging upon and enveloping the said propellant.

As rocket 5 moves from the launcher tube, it is important to appreciate that link 27 readily separates from neck 25, thereby in no way impeding the launching process. When one considers the similar ease with which links 29 and 27 disconnect upon cap removal it is clear that the overall structure of height adjustment linkage 31 is such as to enable completely effective and accurate positioning of seal plate 17, and yet the linkage is readily disruptable during the pre-firing and firing operations.

While the present invention has been particularly set forth in terms of specific embodiments thereof, it will be evident in view of the present disclosure that numerous modifications of the invention may now be readily devised by those skilled in the art without departing from the teaching herein. For example while the nozzle groups present at plate 19 of the invention are in the form of paired units, it will be evident that similar results can be achieved by utilizing groups of three or more nozzles, provided the member units are arranged in a symmetrical manner with respect to the rocket axis. Similarly, other mechanical arrangements may be utilized to effect rotational adjustment of seal plate 17 in addition to the specific height adjustment linkage depicted.

I wish it to be understood that I do not desire to be limited to the exact detail of construction shown and described for obvious modification will occur to a person skilled in the art.

We claim:

1. A rocket assembly presettable by the user to provide in the rocket discharged therefrom a discrete thrust level in accordance with a desired height to be attained by said rocket, comprising:
   1. a launcher tube;
   2. a rocket adapted for nesting in said tube, said rocket having (a) a solid propellant, (b) a motor tube containing said solid propellant, (c) a nozzle plate at the end of said motor tube provided with a plurality of pairs of nozzle units, the unit members of a pair being symmetrically arranged with respect to the rocket axis, each of said pairs of nozzle units being adapted to provide one of said discrete thrust levels when propellant gases from said motor tube exit therethrough, said nozzle units comprise nozzle-configured channels through said nozzle plate, the cant angle of said nozzle units varying from pair to pair whereby to at least partially provide said discrete thrust levels, the rotational setting of said seal plate serving to align said apertures with a selected pair of said nozzle-configured channels, and (d) a manually rotatable seal plate positioned between said propellant and nozzle plate, sealing the gas flow path between said propellant and nozzle plate, said seal plate being provided with apertures therethrough for directing gas flow from said propellant into one or another of said nozzle units in accordance with the preset rotational position of said seal plate; and
   3. manually operable igniter means in said launcher tube for expelling said rocket and igniting said propellant.

2. Apparatus in accordance with claim 1, wherein some only of said nozzle-configured channels include expansion zones, said zones effecting additional energy extraction from gases proceeding through said channels whereby to at least partially provide said discrete thrust levels among said nozzle pairs.

3. Apparatus in accordance with claim 1, further including a frictionally held end cap covering the motor end of said launcher tube, said cap being mechanically linked to said seal plate so that said cap and said plate may rotate as a unit, whereby the rotational position of said seal plate may be set by rotation of said cap, said linkage between said plate and cap being disruptable by removal of said cap.

4. Apparatus in accordance with claim 3, wherein said end cap has an indicator thereon alignable with thrust-correlated indicia located on the adjacent wall of said launcher tube, whereby said user may determine the setting achieved by rotation of said cap.

5. Apparatus in accordance with claim 3 wherein said igniter means is affixed to the motor end of said launching tube and said seal plate includes a neck portion extending through said nozzle plate toward said igniter means; and wherein a first link is mechanically joined to said end cap, and a second link is joined to said seal plate, said first link being fixed to rotate with said end cap and extending into keyed frictional engagement with said second link, said second link passing through said igniter means and in turn extending into keyed frictional engagement with the said neck portion of said seal plate, whereby removal of said end cap disrupts the keyed engagement of said first and second links and whereby expelling of said rocket disrupts the keyed engagement of said second link with said neck.

6. A rocket for signaling and illuminating assemblies or the like, presettable by the user to provide a discrete thrust level in accordance with a desired height to be attained by the rocket, comprising:
 1. a solid propellant;
 2. a motor tube containing said solid propellant;
 3. a nozzle plate at the end of said motor tube provided with a plurality of pairs of nozzle units, the unit members of said pair being symmetrically arranged with respect to the rocket axis, each of said pair being adapted to provide one of said discrete thrust levels when propellant gases from said motor tube exit therethrough, said nozzle units comprise nozzle-configured channels through said nozzle plate, the cant angle of said nozzle units varying from pair to pair whereby to at least partially provide said discrete thrust levels, the rotational setting of said seal plate serving to align the apertures therein with a selected pair of said nozzle-configured channels; and
 4. a manually rotatable seal plate positioned between said propellant and nozzle plate, sealing the gas flow path between said propellant and nozzle plate, said seal plate being provided with apertures therethrough for directing gas flow from said propellant into one or another of said nozzle units in accordance with the preset rotational position of said seal plate.

7. Apparatus in accordance with claim 6, wherein only some of said nozzle-configured channels include expansion zones, said zones effecting additional energy extraction from gases proceeding through said channels whereby to at least partially provide said discrete thrust levels among said nozzle pairs.

* * * * *